United States Patent

[11] 3,625,551

[72] Inventors Donald L. Branton
Delavan;
Hugh W. Sittig, Walworth, both of, Wis.
[21] Appl. No. 14,079
[22] Filed Feb. 25, 1970
[45] Patented Dec. 7, 1971
[73] Assignee Sta-Rite Industries, Inc.
Delavan, Wis.

[54] COUPLING FOR TUBULAR MEMBERS
4 Claims, 4 Drawing Figs.
[52] U.S. Cl. ................................................ 285/305,
285/347
[51] Int. Cl. ................................................... F16l 37/00
[50] Field of Search.......................................... 285/305,
321, 81, 82, 87, 347; 287/DIG. 7; 24/218

[56] References Cited
UNITED STATES PATENTS
3,314,696 4/1967 Ferguson et al. ............. 285/305 X 1,009,278 11/1921 Bruning........................ 24/218 X
FOREIGN PATENTS
1,266,071 4/1968 Germany...................... 285/305
1,527,890 4/1968 France .......................... 285/305

Primary Examiner—Dave W. Arola
Attorney—Andrus, Sceales, Starke & Sawall

ABSTRACT: A pipe connector assembly for connecting tubular members together and including a female connector and a cooperating male connector. A spring retainer is mounted on the female connector and includes an arm that is biased inwardly within a slot formed in the female connector and is arranged to engage a groove in the male connector when the male connector has fully penetrated the female connector. An O-ring seal is incorporated in the assembly to produce a fluid-tight pipe connection between the connectors.

PATENTED DEC 7 1971
3,625,551
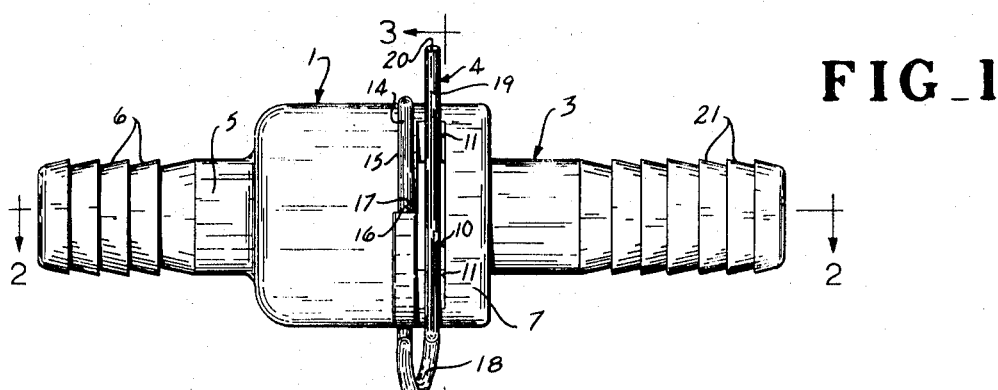
FIG_1
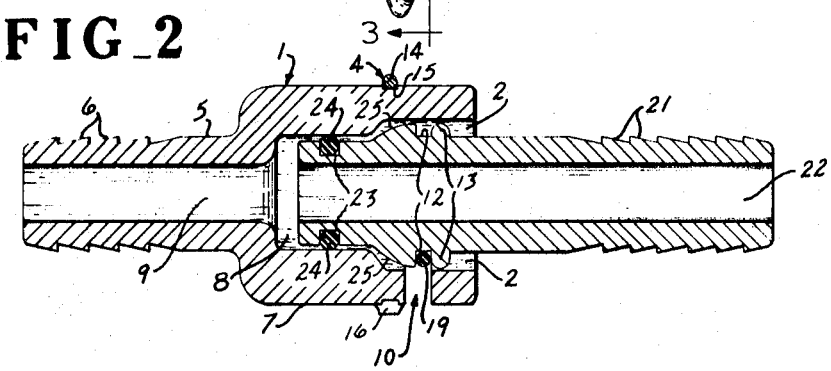
FIG_2
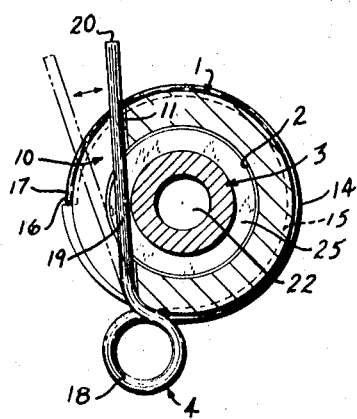
FIG_3
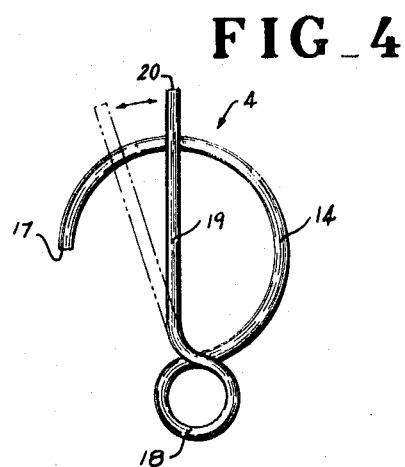
FIG_4
INVENTORS
DONALD L. BRANTON
HUGH W. SITTIG
BY
Andrus, Sceales, Starke, & Sawall
Attorneys

COUPLING FOR TUBULAR MEMBERS

In a pipeline, pipe sections are attached together to form a continuous flow system. In some cases the pipe sections are connected together in a permanent manner by use of adhesives or welding, while in other cases the pipe sections are removably connected by use of manually releasable couplings or connectors.

The present invention is directed to an improved connector construction for a conduit system, which can be connected and disconnected with relative ease. More specifically, the invention encompasses a concept of securing a male connector or fitting within a female connector or fitting by use of a unique spring retainer.

The spring retainer is permanently mounted on the outer surface of the female connector and includes an arm which is urged inwardly within a slot formed in the female connector and is designed to engage a groove in the male connector after the male connector has penetrated to an appropriate position. More particularly, the arm of the spring retainer is pushed radially outward by an inclined surface on the male connector as the male connector moves forward into position within the female conductor. After passing the inclined surface, the arm of the spring retainer will snap into a positioning groove located in the male connector which is formed between the inclined surface and a flange, thereby securing the connection. An O-ring seal is also employed on the male connector and bears against the inner surface of the female connector to insure a fluidtight connection between the two connectors.

When the connection is disassembled, the holding arm of the spring device is simply lifted in a radially outward direction to disengage the arm from the groove which allows the male connector to be disengaged from the female connector. The spring device remains in its relative permanent position on the female connector after the removal of the male connector and is capable of being utilized again.

The connector assembly is designed for simplicity and ease of operation which allows an inexperienced person to install or remove the assembly. The relatively costly prefabrication which is sometimes required in pipe connections is eliminated and the system can be readily disassembled without expenditure of considerable labor and time, thus providing a more flexible system.

In addition, the connector assembly of the invention has only a few parts and only the O-ring seal is subject to replacement. If the O-ring seal needs replacing, the connection can be quickly disassembled as described above and the replacement easily made.

The connector assembly can be made from plastic, metal or other material which has the desired rigidity. If plastic is used, the assembly will also be corrosion resistant.

The subject invention can be utilized with any liquid line, such as that used in the dairy, petroleum, beverage and chemical industries, and has particular application for connecting lengths of flexible tubing or conduit.

Other objects and advantages will appear in the course of the following description.

The drawings illustrate the best mode presently contemplated of carrying out the invention.

In the drawings:

FIG. 1 is a plan view of the connector assembly showing the male connector in assembled position;

FIG. 2 is a sectional view taken along line 2—2 of FIG. 1;

FIG. 3 is a transverse section taken along lines 3—3 of FIG. 1; and

FIG. 4 is a plan view of the spring retainer.

The drawings illustrate a pipe connector assembly to be used for connecting tubing or pipe sections together which includes a female connector 1 having a central opening 2 to receive a male connector 3. Male connector 3 is secured within central opening 2 by a spring retainer 4.

Female connector 1 has a stem 5 provided with barbs 6 and the stem is adapted to be inserted with the end of the tubing or pipe section. The female connector also includes an enlarged body section 7 having a central recess 8 that communicates with the central passage 9 in stem 5. Female connector 1 contains a slot 10 extending through the wall to the central recess 8. As shown in FIGS. 2 and 3, slot 10 lies in a radial plane and has a depth such that the surfaces 11 bordering the slot 10 are generally tangential to the bottom of a groove 12 formed in the male connector 3 when male connector 3 is engaged with female connector 1. Groove 12 extends circumferentially of the male connector 3 and lies in the radial plane of slot 10. Groove 12 is bordered by an annular projection 13 which lies in an axial plane offset from slot 10.

Spring retainer 4 is composed of a material which allows sufficient flexibility for spring action. Spring retainer 4 has a body portion 14 which extends circumferentially beyond 180° and which the embodiment portrays at approximately 270°. Body portion 14 is mounted within a groove 15 formed in the outer surface of female connector 1, and due to the fact that the body portion extends only about 270°, it can be readily snapped into position in the groove 15. Groove 15 does not extend continuously around the circumference of the body section, but instead terminates in a projection or stop 16, and the end 17 of the body portion 14 engages the stop to prevent free rotation of the body portion in groove 15. Body portion 14 terminates in a 360° bent portion 18, the latter terminating in a generally straight holding arm 19 and the end 20 of the arm projects beyond the body portion 14. Bent portion 18 provides spring retainer 4 with spring capability to urge the arm 19 into locking engagement with groove 12 in male connector 3.

The outer end of male connector 3 is provided with a series of barbs 21 and is adapted to be inserted within the end of a tube or pipe section. Connector 3 is also formed with a central passage 22 which is aligned with passage 9 of connector 1. A circumferential groove 23 is constructed on male connector 3 adjacent its inner end and is arranged to contain an O-ring seal 24. The groove 12 on male connector 3 is formed with an inclined surface 25 which faces the inner end of the male connector.

Spring retainer 4 is permanently mounted on female connector 1 so that arm 19 lies within slot 10 with end 20 extending beyond the periphery of the female connector 1. End 17 is positioned against projection 16 to prevent free rotational movement or slippage of the retainer. As the male connector is inserted into female connector 1, incline surface 25 will contact the arm 19. Subsequent, moderate pressure upon the male connector will cause arm 19 to move in a radially outward direction due to the wedging affect of the incline surface 25. When incline surface 25 progresses beyond arm 19 and slot 10, arm 19 will snap radially inward into recess 12 due to the spring action of bent portion 18, thereby securing male connector 3 within female connector 1.

O-ring seal 24 engages the inner wall of the female connector and provides a fluidtight seal between the members.

To release the coupling, arm 19 can be moved in a radially outward direction to an unlocked position beyond inclined surface 25, thus allowing male connector 3 to be removed from female connector 1. After male connector 3 has been removed, spring retainer 4 will remain in position and be ready to form another connection whenever desired.

An additional feature of the invention is the adaptability to various diameter pipe sections. An adapter, not shown, may be utilized and will fit over either barbs 6 or 21, or both to provide a connection to either larger or smaller diameter tubing or conduit. The same pipe connector assembly can therefore be utilized for various sizes of tubes and pipes.

The pipe connector assembly of this invention can also be utilized in any number of different arrangements such as in an elbow connector, a "T" connector, a cross-coupling connector and others. It thus provides an inexpensive and easily assembled coupling device which can be utilized in any number of different arrangements and still be readily assembled and disassembled. Moreover, only a few parts are subject to wear in service. If the O-ring seal 24 needs to be replaced, it can be readily removed without damaging or deforming female and male connectors 1 and 3 or the spring retainer 4.

Various modes of carrying out the invention are contemplated as being within the scope of the following claims, particularly pointing out and distinctly claiming the subject matter which is regarded as the invention.

We claim:

1. A connector assembly for connecting tubular members, comprising a female connector having a central opening and having a circumferential slot lying in a first transverse plane and extending through the wall thereof and communicating with said opening, said female connector having a circumferential groove adjacent the slot and lying in a second transverse plane offset from said first plane, an abutment extending across the groove and defining a stop, a male connector to be received within the opening in the female connector and having a recess in the outer surface, said recess being located in alignment with said slot when the male connector is received within said opening, and a connecting member for removably attaching said connections together, said connecting member including a generally curved body portion extending through an arc greater than 180° and disposed within the groove, said body portion terminating in a free end engaged with said stop to prevent free rotation of said body portion on said female connector, said connecting member also having an arm connected to said body portion and extending within said slot and engaged with the recess in said male connector to retain the male connector within the opening, said arm being disposed in a plane offset from a plane formed by said body portion and the end of the arm projecting beyond the periphery of said female connector, said connecting member also including a 360° loop connecting said body portion and said arm and acting to bias the arm inwardly into locking engagement with said recess.

2. The assembly of claim 1 and including wedge means connected to the male connector and arranged to engage said arm when the male connector is inserted within said opening to move the arm radially outward against the biasing force 3. The structure of claim 1 in which said male connector contains an O-ring seal which circumferentially contacts the portion of said female connector bordering the central opening.

4. The structure of claim 1 in which said male connector has an inclined surface arranged to contact and move said arm in a radially outward direction to an unlocked position when said male connector is being inserted within said opening.

* * * * *